United States Patent [19]
Gutman

[11] 3,760,040
[45] Sept. 18, 1973

[54] PHOSPHORUS CONTAINING COMPOUNDS
[75] Inventor: Arnold D. Gutman, Berkeley, Calif.
[73] Assignee: Stauffer Chemical Company, New York, N.Y.
[22] Filed: Apr. 24, 1972
[21] Appl. No.: 247,172

[52] U.S. Cl............... 260/941, 260/942, 260/973, 260/984, 424/212
[51] Int. Cl........... C07f 9/08, C07f 9/20, C07f 9/24
[58] Field of Search................. 260/941, 942, 944

[56] References Cited
UNITED STATES PATENTS
3,681,479  8/1972  Gutman ............................ 260/944
3,709,960  1/1973  Lutz et al........................... 260/941

Primary Examiner—Lewis Gotts
Assistant Examiner—Richard L. Raymond
Attorney—Edwin H. Baker et al.

[57] ABSTRACT

The compounds of this invention are those having the formula

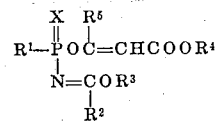

in which
R$^1$ is alkyl or alkoxy,
R$^2$ is hydrogen or alkyl,
R$^3$ is alkyl,
R$^4$ is alkyl,
R$^5$ is methyl or —CH$_2$COOCH$_3$ and
X is oxygen or sulfur and their use as insecticides and acaricides.

10 Claims, No Drawings

PHOSPHORUS CONTAINING COMPOUNDS

This invention relates to certain novel phosphorus containing chemical compounds and their use as insecticides and acaricides.

The compounds of this invention are those having the formula

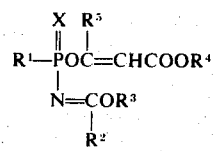

in which $R^1$ is alkyl having one to four carbon atoms or alkoxy having one to four carbon atoms, $R^2$ is hydrogen or alkyl having one to six carbon atoms, preferably one to four carbon atoms, $R^3$ is alkyl having one to six carbon atoms, preferably one to four carbon atoms, $R^4$ is alkyl having one to four carbon atoms, $R^5$ is methyl or $-CH_2COOCH_3$ and X is oxygen or sulfur.

The compounds of the present invention can be prepared according to the following reactions:

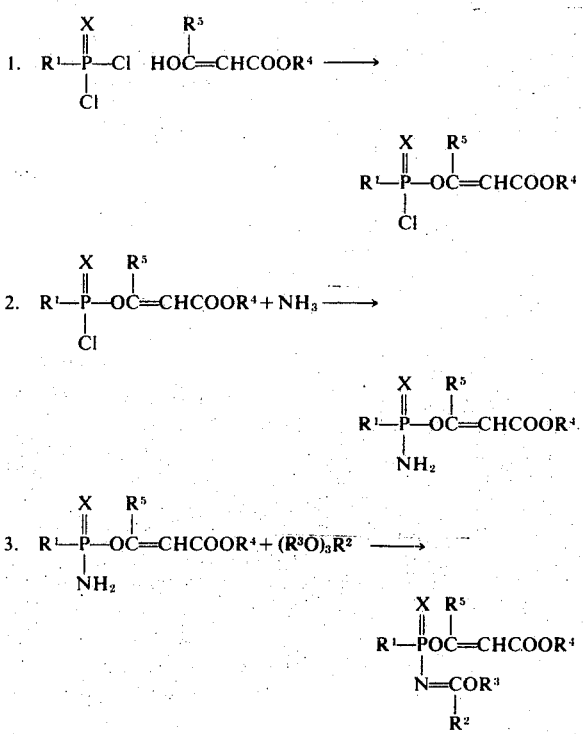

Reaction I is carried out by reacting preferably equal mole amounts of the two reactants. If an excess of either reactant is used, the reaction still proceeds but purity is reduced. The reactants can be combined in any manner but preferably the reactants are mixed together in a solvent such as benzene, preferably with stirring in the presence of an acid acceptable such as triethylamine. The temperature of the reaction is not critical, however, better yields are obtained by keeping the reactants at a temperature below 30°C for a time sufficient to allow completion of the reaction. The resulting product can be recovered from the reaction mixture by conventional means such as by washing the benzene mixture with water. The benzene is dried with anhydrous $MgSO_4$ and then evaporated to yield the desired product. A more purified product can be obtained by distilling in vacuo.

Preferably, Reaction II is carried out by reacting an excess of ammonia with the other reactant. The reactants can be combined in any desired manner, but preferably, the reaction is run in a solvent such as diethyl ether at a temperature below 30°C. The resulting product is recovered and purified by standard procedure. For example, the resulting product can be recovered and purified from the reaction mixture by washing with water. The ether phase is dried with anhydrous $MgSO_4$ and evaporated to yield the purified product.

Reaction III utilized as a reactant the product of Reaction II. In the process, the reaction is carried out by reacting preferably about equal mole amounts of the reactants. An excess of the ortho ester reactant can be used. Although the reactants can be combined in any desired manner, it is preferred to mix the reactants in a solution of acetonitrile solvent in the presence of alcoholic HCl. Preferably, the reaction is carried out at a temperature about 100°C. The reaction product is recovered by conventional means such as by stripping in vacuo at 40°C and 0.01 millimeter pressure to yield the purified product.

Preparation of the compounds of this invention is illustrated in the following examples:

EXAMPLE I

O-(2-carbomethoxy-1-methylvinyl) methylphosphonothiochloridate

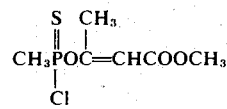

149 grams (1.0 mole) of methylphosphonothioic dichloride, 116 grams (1.0 mole) of methyl acetoacetate and 750 milliliters of benzene are charged into a two liter 3 neck flask fitted with a stirrer, thermometer and dropping funnel. The solution is cooled in an ice bath to 10°C. To the rapidly stirring solution is added 101 grams (1.0 mole) of triethylamine at such a rate that the temperature does not exceed 30°C. After the addition is complete the reaction mass is stirred at room temperature for 1 hour and then at 35°–40°C for two hours. When the pH of the reaction mass becomes acidic, it is cooled to 15°C and is washed with two 350 milliliter portions of water. The benzene phase is then dried with anhydrous $MgSO_4$ and evaporated. The residue was distilled in vacuo to give 103.7 grams of the desired intermediate product. B.P. 83°–85°C/$_{0.1mm}$

EXAMPLE II

O-(carbomethoxy-1-methylvinyl) methylphosphonothioamidate

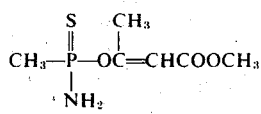

50 grams (0.224 mole) of the reaction product of Example I is combined with 250 milliliters of diethylether in a 500 milliliter Erlenmeyer flask. The solution is cooled in an ice bath and is saturated with anhydrous ammonia gas. The reaction mass is then transferred to a separatory funnel and is washed with two 200 milliliter portions of water. The ether phase is dried with anhydrous MgSO₄ and evaporated to yield 41.0 grams of the desired intermediate product. $N_D^{30}$—1.5301.

EXAMPLE III

O-(carbomethoxy-1-methylvinyl) N-ethoxyformylidene) methylphosphonothioamidate

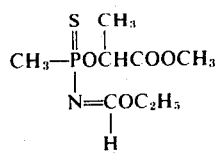

8.0 grams (0.0395 mole) of the reaction product of Example II, 14.8 grams (0.1 mole) of triethylorthoformate, 50 milliliters of acetonitrile, and 0.2 milliliters of alcoholic HCl are combined in a 250 milliliter round bottom flask. The mixture is heated on a steam bath until the pot temperature reaches 100°C. The reaction mass is then stripped in vacuo at 40°C and 0.01 millimeter to yield 9.0 grams of the desired compound. $N_D^{30}$—1.5097.

EXAMPLE IV

O-(2-carbomethoxy-1-methylvinyl) O-ethylphosphorothiochloridate

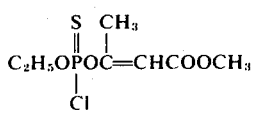

42 grams (0.2 mole) of 25 percent sodium methoxide solution and 23.2 grams (0.2 mole) of methyl acetoacetate are combined in a 500 milliliter round bottom flask. After a slight exotherm subsides, the mixture is heated on a steam bath for 15 minutes. The reaction mass is then stripped in vacuo. The residue is titrated with 250 milliliters of benzene, and the reaction mass is again stripped in vacuo. The residue is dissolved in 400 milliliters of tetrahydrofuran.

35.8 grams (0.2 mole) of ethylphosphorothioic dichloride and 150 milliliters of tetrahydrofuran are combined in a one liter 3 neck flask fitted with a stirrer, thermometer and dropping funnel. The solution is stirred and cooled in an ice bath to 5°C, and the tetrahydrofuran salt solution is added at such a rate that the reaction temperature does not exceed 15°C. After the addition is complete, the mixture is stirred at room temperature until the pH becomes acidic. 500 milliliters of diethylether are then added, and the mixture is washed with three 300 milliliter portions of ice water. The ether phase is dried with anhydrous MgSO₄ and evaporated in vacuo at 100°C and 0.1 millimeter to yield 30 grams of the desired intermediate product. $N_D^{30}$—1.4980.

EXAMPLE V

O-(2-carbomethoxy-1-methylvinyl) O-ethylphosphorothioamidate

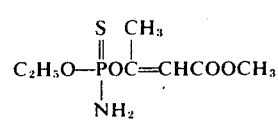

30.0 grams (0.116 mole) of the reaction product of Example IV is combined with 250 milliliters of diethylether in a 500 milliliter Erlenmeyer flask. The solution is cooled in an ice bath and is saturated with anhydrous ammonia gas. The reaction mass is then transferred to a separatory funnel and washed with two 200 milliliter portions of water. The ether phase is dried with anhydrous MgSO₄ and evaporated to yield 24.1 grams of the desired product. $N_D^{30}$—1.5082.

EXAMPLE VI

O-(2-carbomethoxy-1-methylvinyl)N-(α-ethoxypropylidene)O-ethylphosphorothioamidate

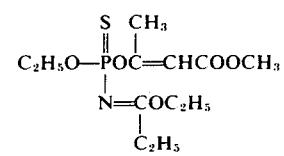

5.0 grams (0.0208 mole) of the reaction product of Example V, 8.8 grams (0.05 mole) of triethylorthopropionate, 50 milliliters of acetonitrile, and 0.2 milliliters of alcoholic HCl are combined in a 250 milliliter round bottom flask. The mixture is heated on a steam bath until the pot temperature reaches 100°C. The reaction mass is then stripped in vacuo at 90°C and 0.01 millimeter to yield 5.5 grams of the desired compound. $N_D^{30}$—1.4943.

The following is a Table of certain selected compounds that are preparable according to the procedure described hereto. Compound numbers are assigned to each compound and are used throughout the remainder of the application.

TABLE I

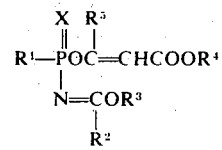

| Compound Number | X | R¹ | R² | R³ | R⁴ | R⁵ | $N_D^{30}$ |
|---|---|---|---|---|---|---|---|
| 1 | S | C₂H₅ | CH₃ | C₂H₅ | CH₃ | CH₃ | 1.4940 |
| 2 | S | C₂H₅ | C₂H₅ | C₂H₅ | CH₃ | CH₃ | 1.5065 |
| 3 | S | C₂H₅ | H | CH₃ | CH₃ | CH₃ | 1.5154 |
| 4 | S | C₂H₅ | H | C₂H₅ | CH₃ | CH₃ | 1.5072 |
| 5 | S | CH₃ | H | C₂H₅ | CH₃ | CH₃ | 1.5097 |
| 6 | S | CH₃ | CH₃ | C₂H₅ | CH₃ | CH₃ | 1.5022 |
| 7 | S | CH₃ | C₂H₅ | C₂H₅ | CH₃ | CH₃ | 1.4906 |
| 8 | S | CH₃ | H | CH₃ | CH₃ | CH₃ | 1.5176 |
| 9 | S | EtO | H | C₂H₅ | CH₃ | CH₃ | 1.4980 |

TABLE 1—Continued

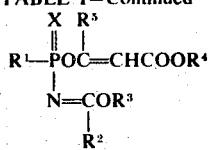

| Compound Number | X | $R^1$ | $R^2$ | $R^3$ | $R^4$ | $R^5$ | $N_D^{30}$ |
|---|---|---|---|---|---|---|---|
| 10 | S | EtO | $CH_3$ | $C_2H_5$ | $CH_3$ | $CH_3$ | 1.5029 |
| 11 | S | EtO | $C_2H_5$ | $C_2H_5$ | $CH_3$ | $CH_3$ | 1.4943 |
| 12 | O | EtO | H | $C_2H_5$ | $CH_3$ | $CH_3$ | 1.4712 |
| 13 | O | EtO | $CH_3$ | $C_2H_5$ | $CH_3$ | $CH_3$ | 1.4740 |
| 14 | O | EtO | $C_2H_5$ | $C_2H_5$ | $CH_3$ | $CH_3$ | 1.4658 |
| 15 | S | $C_2H_5$ | H | $C_2H_5$ | $CH_3$ | $CH_2COOCH_3$ | 1.5037 |
| 16 | S | $C_2H_5$ | $C_2H_5$ | $C_2H_5$ | $CH_3$ | $CH_2COOCH_3$ | 1.4887 |
| 17 | S | $C_2H_5$ | H | $C_2H_5$ | $C_2H_5$ | $CH_3$ | 1.4980 |
| 18 | S | $C_2H_5$ | H | $(CH_2)_3CH_3$ | $C_2H_5$ | $CH_3$ | 1.4710 |
| 19 | S | $C_2H_5$ | $(CH_2)_3CH_3$ | $CH_3$ | $C_2H_5$ | $CH_3$ | 1.4924 |
| 20 | S | $C_2H_5$ | $CH_3$ | $C_2H_5$ | $C_2H_5$ | $CH_3$ | 1.4987 |
| 21 | S | $C_2H_5$ | $C_2H_5$ | $C_2H_5$ | $C_2H_5$ | $CH_3$ | 1.4820 |
| 22 | S | $C_2H_5$ | H | $CH_3$ | $C_2H_5$ | $CH_3$ | 1.5078 |

Insecticidal Evaluation Tests

The following insect species were used in evaluation tests for insecticidal activity:

1. Housefly (HF) - *Musca domestica* (Linn.)
2. German Roach (GR) - *Blatella germanica* (Linn.)
3. Lygus Bug (LB) - *Lygus hesperus* (Knight)
4. Salt-marsch Caterpillar (SMC) - *Estigmene acrea* (Drury)
5. Bean Aphid (BA) - *Aphis fabae* (Scop.)
6. Beet Armyworm (BAW) - *Spodoptera exigua* (Hubner)
7. Tobacco Budworm (TBW) - *Heliothis virescens* (F.)
8. Mosquito (MOS) - *Culex pipiens quinquefasciates*

The Housefly (HF) was used in evaulation tests of selected compounds as insecticides by the following procedure. A stock solution containing 100 ug/ml of the toxicant in an appropriate solvent was prepared. Aliquots of this solution were combined with 1 milliliter of an acetone-peanut oil solution in an aluminum dish and allowed to dry. The aliquots were there to achieve desired toxicant concentration ranging from 100 ug per dish to that at which 50 percent mortality was attained. The dishes were placed in a circular cardboard cage, closed on the bottom with cellophane and covered on top with cloth netting. Twenty-five female houseflies, three to five days old, were introduced into the cage and the percent mortality was recorded after 48 hours. The LD-50 values are expressed in terms of ug per 25 female flies. The results of these insecticidal evaluation tests are given in Table II under "HF."

In the German Cockroach (GR) tests, 10 one-month old nymphs were placed in separate circular cardboard cages sealed on one end with cellophane and covered by a cloth netting on the other. Aliquots of the toxicants, dissolved in an appropriate solvent, were diluted in water containing 0.002 percent of a wetting agent, Sponto 221, - (a polyoxyether of alkylated phenols blended with organic sulfonates). Test concentrations ranged from 0.1 percent downward to that at which 50 percent mortality was obtained. Each of the aqueous suspensions of the candidate compounds was sprayed onto the insects through the cloth netting by means of a hand-spray gun. Percent mortality in each case was recorded after 72 hours, and the LD-50 values, expressed as percent of toxicant in the aqueous spray, were recorded. These values are reported under the column "GR" in Table II.

The Lygus Bug (LB), *Lygus hesperus*, was tested similarly as the German Cockroach. The caged insects were sprayed with the candidate compounds at concentrations ranging from 0.05 percent downward to that at which 50 percent mortality was obtained. After 24 and 72 hours, counts were made to determine living and dead insects. The LD-50 (percent) values were calculated. These values are reported under the column "LB" in Table II.

The insect species Black Bean Aphid (BA), *Aphis fabae*, (Scop.) - was also employed in the test for insecticidal activity. Yound nasturtium (*Tropaeolum* sp.) plants, approximately 2 to 3 inches tall, were used as the host plants for the Bean Aphid. The host plant was infested with approximately 50–75 of the aphids. The test chemical was dissolved in acetone, added to water which contained a small amount of Sponto 221, an emulsifying agent. The solution was applied as a spray to the infested plants. Concentrations ranged from 0.05 percent downward until an LD-50 value was achieved. These results are given in Table II under the Column "BA."

For testing the Salt-marsh Caterpillar, test solutions were prepared in an identical manner and at concentrations the same as for the German Cockroach, above. Sections of bitter dock, *Rumex obtusifolus*, leaves, 1–1.5 inches in length were immersed in the test solutions for 10 to 15 seconds and placed on a wire screen to dry. The dried leaf was placed on a moistened piece of filter paper in a Petri dish and infested with five third-instar larvae. Mortality of the larvae was recorded after 72 hours, and the LD-50 values are expressed as percent active ingredient in the aqueous suspension.

In the insecticidal test employing Beet Armyworm, test solutions were prepared in the same manner and at the same concentrations as those used for German Cockroach test. Sections of Romaine lettuce (*Latuca sativa*) were utilized as the host plant. The lettuce leaves were immersed in the test solution for 10–15 seconds and placed on a wire screen to dry. The dried leaf was placed on a moistened piece of filter paper in a Petri dish and infested with five third-instar larvae. Mortality of the larvae was recorded after 72 hours. The LD-50 values are expressed as percent active ingredient in the aqueous suspensions. These values are reported under Column "BAW" in Table II.

The test on Tobacco Budworm [*Heliothis virescens* (F.)] is the same as the one for the Salt-marsh Caterpillar except that leaves of Romaine lettuce (*Latuca sativa*) are utilized as the host plant rather than bitter dock. The LD-50 values are expressed as percent active ingredients in the aqueous suspension and are reported under the column "TBW" in Table II.

In the Mosquito Bioassay one hundred milliliters of an aqueous solution of the candidate compound, at an initial concentration of 0.5 p.p.m., are placed in a 6 ounce wax paper cup. Ten late third or early fourth instar larvae of the mosquito *Culex pipiens quinquefasciates* are placed in each cup and the cups are stored at 70°F for three days. At the end of this time, mortality counts are made. Compounds which are active at 0.5 p.p.m. are retested at progressively lower concentrations until an LD-50 value is determined. These results are given in Table II under the column "MOS."

Acaricidal Evaluation Test

The two-spotted mite (2SM), *Tetranychus urticae* (Koch), was employed in tests for miticides. Young pinto bean plants or lima bean plants (Phaseolus sp.) in the primary leaf stage were used as the host plants. The young pinto bean plants were infested with about 100 mites of various ages. Dispersions of candidate materials were prepared by dissolving 0.1 gram in 10 milliliters of a suitable solvent, usually acetone. Aliquots of the toxicant solutions were suspended in water containing 0.002 percent v/v Sponto 221, polyoxyethylene ether sorbitan monolaurate, an emulsifying agent, the amount of water being sufficient to give concentrations of active ingredient ranging from 0.05 percent to that at which 50 percent mortality was obtained. The test suspensions were then sprayed on the infested plants to the point of run off. After seven days, mortalities of postembroyonic and ovicidal forms were determined. The percentage of kill was determined by comparison with control plant which had not been sprayed with the candidate compounds. The LD-50 values were calculated using well-known procedures. These values are reported under the columns "2SM-PE" and "2SM-Eggs" in Table II.

Systemic Evaluation Test

This test evaluates the root absorption and upward translocation of the candidate systemic compound. The two-spotted mite (2SM) *Tetranychus urticae*, (Koch) and the Bean Aphid (BA) - *Aphis fabae* (Scop.) were employed in the test for systemic activity.

Young pinto bean plants in the primary leaf stage were used as host plants for the two-spotted mite. The pinto bean plants were placed in bottles containing 200 milliliters of the test solution and held in place with cotton plugs. Only the roots were immersed. The test solutions were prepared by dissolving the compounds to be tested in a suitable solvent, usually acetone, and then diluting with distilled water. The final acetone concentration never exceeded about 1 percent. The toxicants were initially tested at a concentration of 10 parts per million (p.p.m.). Immediately after the host plant was placed in the test solution it was infested with the test species. Mortalities were determined after seven days.

Young nasturtium plants were used as the host plants for the Bean Aphid. The host plants were transplanted into one pound of soil that had been treated with the candidate compound. Immediately after planting in the treated soil the plants were infested with aphids. Concentrations of toxicant in the soil ranged from 10 p.p.m. per pound of soil downward until an LD-50 value was obtained. Mortality was recorded after 72 hours.

The percentage of kill of each test species was determined by comparison with control plants placed in distilled water or untreated soil. The LD-50 values were calculated. These systemic test results are reported in Table II under the columns "BA-Sys" and "2SM-Sys."

TABLE II
LD-50 VALUES

| Compound Number | HF (percent) | GR (percent) | LB (percent) | BA (percent) | BA-SYS (p.p.m.) | SMC (percent) | BAW (percent) | TBW (percent) | 2SM PE (percent) | 2SM EGGS (percent) | 2SM SYS (p.p.m.) | MOS (p.p.m.) |
|---|---|---|---|---|---|---|---|---|---|---|---|---|
| 1 | 3 | .003 | .002 | .001 | 3 | .01 | .003 | .01 | <.05 | <.05 | 3 | .03 |
| 2 | 3 | .003 | .008 | .003 | 3 | .05 | .001 | .03 | <.05 | <.05 | 3 | .03 |
| 3 | 4 | .008 | .002 | .003 | 3 | .1 | .03 | .01 | | | | .5 |
| 4 | 4 | .008 | .0008 | .0003 | | | .01 | .05 | | | | >.5 |
| 5 | 2 | .008 | .0003 | .005 | 10 | >.1 | .01 | .05 | <.05 | <.05 | 10 | .5 |
| 6 | 5 | .008 | .001 | .0003 | 3 | | .005 | .005 | | | | >.5 |
| 7 | 5 | .005 | .002 | .0005 | 3 | | .01 | .008 | | | | .3 |
| 8 | 3 | .008 | .0008 | .005 | 10 | >.1 | >.1 | | | | | >.5 |
| 9 | 9 | .005 | .0005 | .003 | | >.1 | >.1 | | | | | >.5 |
| 10 | 5 | .005 | .0008 | .003 | | .1 | .08 | .1 | | | | .4 |
| 11 | 3 | .008 | .0008 | .003 | | | .03 | .01 | | | | .3 |
| 12 | 20 | .005 | .001 | .003 | | >.1 | .1 | | | | | >.5 |
| 13 | 3 | .008 | .003 | .008 | | >.1 | .01 | .03 | .05 | .05 | | >.5 |
| 14 | 3 | .008 | .001 | .003 | | >.1 | .01 | .05 | | | | >.5 |
| 15 | 30 | .03 | .001 | .003 | | >.1 | >.1 | >.1 | | | | >.5 |
| 16 | 30 | .03 | .004 | .005 | 10 | >.1 | .1 | | | | | >.5 |
| 17 | 5 | .005 | .0005 | .005 | 10 | .01 | .01 | .03 | | | | .3 |
| 18 | | | | | | .1 | | | | | | |

As those in the art are well aware, various techniques are available for incorporating the active component or toxicant in suitable pesticidal compositions. Thus, the pesticidal sompositions can be conveniently prepared in the form of liquid or solids, the latter preferably as homogeneous free-flowing dusts commonly formulated by admixing the active component with finely divided solids or carriers as examplified by talc, natural clays, diatomaceous earth, various flours, such as walnut shell, sheat, soya bean, cottonseed and so forth.

Liquid compositions are also useful and normally comprise a dispersion of the toxicant in a liquid media, although it may be convenient to dissolve the toxicant directly in a solvent such as kerosene, fuel oil, xylene, alkylated naphthalenes or the like and use such organic solutions directly. However, the more common procedure is to employ dispersions of the toxicant in an aqueous media and such compositions may be produced by forming a concentrated solution of the toxicant in a suitable organic solvent followed by dispersion in water, usually with the aid of surface active agents. The latter, which may be the anionic, cationic, or nonionic types, are exemplified by sodium stearate, potassium oleate and other alkaline metal soaps and detergents such as sodium lauryl sulfate, sodium naphthalene sulfonate, sodium alkyl naphthalane, sulfonate, methyl cellulose, fatty alcohol ethers, polyglycol fatty acid esters and other polyoxyethylene surface active agents. The proportion of these agents commonly comprises 1–15 percent by weight of the pesticidal compositions although the proportion is not critical and may be varied to suit any particular situation.

I claim:

1. The compound having the formula

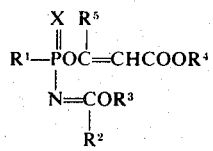

in which $R^1$ is alkyl having one to four carbon atoms or alkoxy having one to four carbon atoms, $R^2$ is hydrogen or alkyl having one to six carbon atoms, $R^3$ is alkyl having one to six carbon atoms, $R^4$ is alkyl having one to four carbon atoms, $R^5$ is methyl or $-CH_2COOCH_3$ and X is oxygen or sulfur.

2. The compounds of claim 1 in which $R^1$ is alkyl having one to four carbon atoms, $R^2$ is alkyl having one to four carbon atoms, $R^3$ is alkyl having one to four carbon atoms, $R^4$ is alkyl having one to four carbon atoms, $R^5$ is methyl and X is sulfur.

3. The compounds of claim 1 in which $R^1$ is alkoxy having one to four carbon atoms, $R^2$ is alkyl having one to four carbon atoms, $R^3$ is alkyl having one to four carbon atoms, $R^4$ is alkyl having one to four carbon atoms, $R^5$ is methyl and X is sulfur.

4. The compounds of claim 1 in which $R^1$ is alkyl having one to four carbon atoms, $R^2$ is hydrogen having one to four carbon atoms, $R^3$ is alkyl having one to four carbon atoms, $R^4$ is alkyl having one to four carbon atoms, $R^5$ is methyl and X is sulfur.

5. The compounds of claim 1 in which $R^1$ is alkoxy having one to four carbon atoms, $R^2$ is hydrogen having one to four carbon atoms, $R^3$ is alkyl having one to four carbon atoms, $R^4$ is alkyl having one to four carbon atoms, $R^5$ is methyl and X is sulfur.

6. The compound of claim 1 in which $R^1$ is ethyl, $R^2$ is methyl, $R^3$ is ethyl, $R^4$ is methyl, $R^5$ is methyl and X is sulfur.

7. The compounds of claim 1 in which $R^1$, $R^2$ and $R^3$ are ethyl, $R^4$ and $R^5$ are methyl and X is sulfur.

8. The compounds of claim 1 in which $R^1$ is ethoxy, $R^2$ and $R^3$ are ethyl, $R^4$ and $R^5$ are methyl and X is sulfur.

9. The compounds of claim 1 in which $R^1$ is ethyl, $R^2$ is hydrogen, $R^3$ and $R^4$ are ethyl, $R^5$ is methyl and X is sulfur.

10. The compounds of claim 1 in which $R^1$ is methyl, $R^2$ and $R^3$ are ethyl, $R^4$ and $R^5$ are methyl and X is sulfur.

* * * * *